Patented Dec. 31, 1940

2,227,215

UNITED STATES PATENT OFFICE 2,227,215

ALKYLENE ETHERS OF THIOAMMELINE

Herman A. Bruson, Philadelphia, Pa., assignor to The Resinous Products & Chemical Company, Philadelphia, Pa.

No Drawing. Application March 13, 1940, Serial No. 323,725

7 Claims. (Cl. 260—248)

This invention relates to new thioammeline ethers having alkylene ether or polyalkylene ether chains attached to the triazine nucleus through a sulfur linkage. Compounds of this type were first disclosed in application Serial No. 283,740, filed July 11, 1939, of which the present application is a continuation-in-part.

It is an object of this invention to provide a simple, practical method of making these new compounds. It is also an object to make available new materials suitable for the production of new resins and for the modification of carbamide-aldehyde resins. It is a further object to provide new products and intermediates not only for resin manufacture but also for many agricultural, pharmaceutical, and industrial products and uses.

According to the invention, thioammeline is condensed in the presence of an alkaline, acid-binding agent with arylaliphatic, heterocyclic-aliphatic, alicyclicaliphatic, and aliphatic ether halides possessing at least three carbon atoms.

In the preferred form of this invention thioammeline is mixed with an aqueous or alcoholic solution or dispersion of an inorganic alkaline material, such as sodium hydroxide, and with an equivalent proportion of the ether halide. In some cases the reaction starts at room temperatures; in other cases heat is required. In either case the reaction is accelerated by heating the mixture with rapid and efficient stirring. It is most convenient to heat the mixture under reflux at 70-100° C., but higher temperatures may be used if the heating is conducted under pressure. The reaction may be accelerated by the presence of catalysts, such as potassium iodide or other iodides, or amines, such as pyridine. The product formed by the reaction usually separates in crystalline form and can then be removed from the reaction mixture by filtration (or other suitable method) and further purified, if desired.

Variations in this general procedure are, of course, allowable. Thus, the halide may be added gradually or in steps or the order of the addition of reacting components may be altered, but still with satisfactory yields.

In place of sodium hydroxide there may be used any other fixed base, or alkaline, acid-binding agent, such as potassium hydroxide, potassium carbonate, sodium carbonate, lime, barium hydroxide, zinc hydroxide; and the like.

The organic halides which are most useful for preparing alkylene ether ammeline thioethers are the β-halogeno-alkyl ethers of monohydric alcohols, of phenols, and of mercaptans. There may be used, for example:

CH₃OCH₂CH₂Br
C₂H₅OCH₂CH₂Cl
CH₃CH₂OCH(CH₃)CH₂Cl
C₄H₉OCH(C₂H₅)CH₂Cl
C₄H₉OCH₂CH₂CH₂OCH₂CH₂CH₂Cl
C₄H₉SCH₂CH₂Cl
CH₃CH(CH₃)OCH₂CH₂Cl
C₄H₉OCH₂CH₂OCH₂CH₂Cl
C₄H₉OCH₂CH₂OCH₂CH₂OCH₂CH₂Cl and analogous higher homologues thereof, such as the amyl, octyl, undecenyl, dodecyl, etc. chloroethers. Furthermore, the corresponding aromatic heterocyclic and hydroaromatic β-chloroalkyl ethers such as the following may also be used:

C₆H₅SCH₂CH₂Cl
C₆H₅OCH₂CH₂Cl
C₆H₅SCH₂CH₂OCH₂CH₂Cl
C₆H₅OCH₂CH₂OCH₂CH₂OCH₂CH₂Cl
C₆H₅OCH₂CH₂OCH₂CH₂OCH₂CH₂OCH₂CH₂Cl
C₆H₅OCH₂—CH₂CH₂OCH₂CH₂CH₂Cl
C₆H₅CH₂OCH₂CH₂Cl;

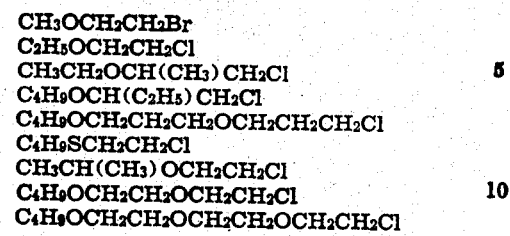

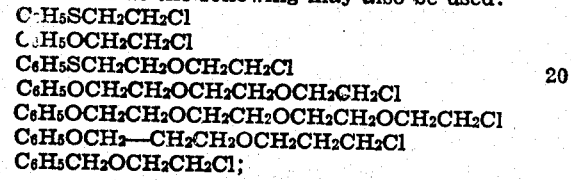

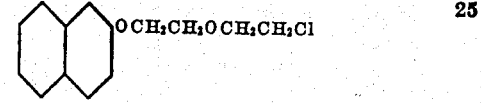

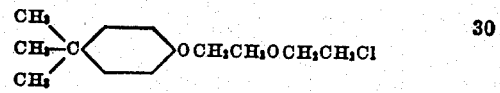

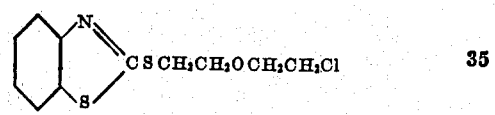

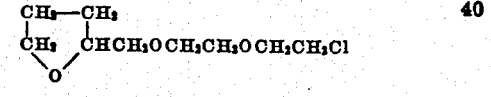

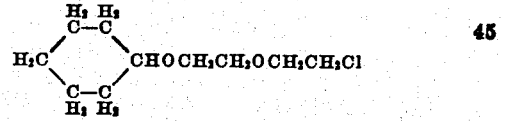

Bornyl—OCH₂CH₂OCH₂CH₂Cl

Any aryl groups present in the ether halides can be substituted nuclearly by halogen, alkyl, aryl, aralkyl, alkoxy, hydroxy, cycloalkyl, nitro, acyl, or other suitable groups or radicals. In place of the chlorides shown there may be used the corresponding bromides, but usually without economic advantage. In reacting chlorides or bromides in the presence of an inorganic iodide, such as potassium iodide, it is probable that organic iodides are formed which are more reactive than the other halides.

The compounds which are obtained by the reaction of thioammeline and ether halide may be represented by the general formula:

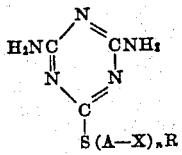

wherein A is an alkylene group of at least two carbon atoms, X represents at least one member of the group consisting of oxygen and sulfur, R represents a member of the group consisting of aryl groups, aralkyl groups, heterocyclic groups, and alicyclic and aliphatic hydrocarbon groups, and $n$ is an integer from one to four.

The following examples are illustrative of this invention:

Example 1

A solution, consisting of 42.9 g. of thioammeline, 13.2 g. of sodium hydroxide, and 300 cc. of water, is mixed with 200 cc. of ethanol and 47 g. of β-chloroethoxybenzene, and boiled under reflux with rapid stirring for 15 hours. The crystalline product which separates is filtered off. After recrystallization from hot alcohol, it separates in colorless, fine crystals melting at 177° C. and having the formula

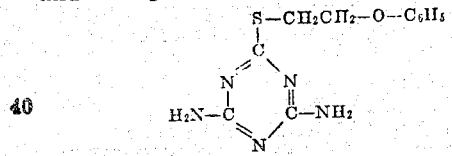

Example 2

(a) In a similar manner 51.2 g. of β-chloroethoxy-o-toluene gives a crystalline compound, M. P. 183° C., having the formula

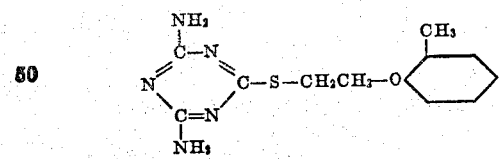

(b) In a similar manner 48.8 g. of cyclohexyloxyethyl chloride gives a crystalline compound having the formula

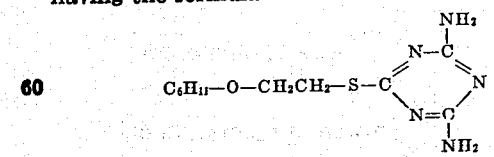

Example 3

To a clear solution of 21.5 g. of thioammeline, 6.6 g. of sodium hydroxide, 100 cc. of water and 100 cc. of ethanol there is added 41 g. of β-chloroethoxyethyl thiobenzothiazole

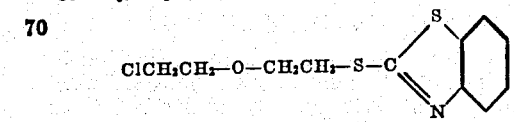

The mixture is stirred rapidly and boiled under reflux for seven hours. The reaction product separates in crystalline form and is removed by filtration. It is washed with dilute potassium hydroxide solution, then with water, and finally with cold alcohol. Upon crystallization from boiling toluene, it separates in colorless crystals, M. P. 137–138° C., having the formula

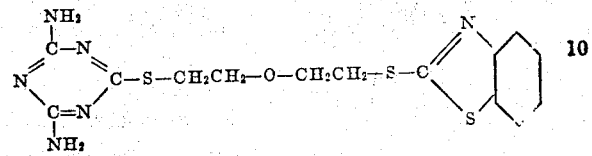

Example 4

A clear solution of 42.9 g. of thioammeline, 13.2 g. of sodium hydroxide, and 300 cc. of water is mixed with 200 cc. of ethanol and 54.2 g. of butoxyethoxyethyl chloride, $$(C_4H_9-O-CH_2CH_2-O-CH_2CH_2Cl)$$

and boiled under reflux for 24 hours while the reaction mixture is rapidly stirred. An oily layer forms which is separated from the aqueous layer, mixed with benzene, and washed with water. On standing, the benzene solution crystallizes. After recrystallization from benzene, the product is obtained in colorless crystals, M. P. 80° C., having the formula

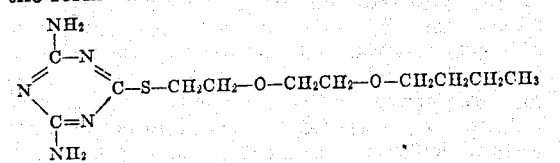

Example 5

To a clear solution of 42.9 g. of thioammeline, 13.2 g. of sodium hydroxide, and 300 cc. of water there is added a mixture of 200 cc. of ethanol and 60.2 g. of β-phenoxy-β'-chlorodiethyl ether. The mixture is stirred and boiled under reflux for 18 hours. The white, insoluble product which forms is filtered off, washed with water, alcohol, and dried. There is obtained 70 g. of white powder, which, upon recrystallization from boiling toluene, separates in fine, colorless needles, M. P. 76–77° C., having the formula

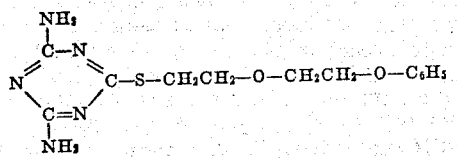

Example 6

To a clear solution of 21.5 g. of thioammeline, 6.6 g. of sodium hydroxide, 150 cc. of water, 100 cc. of ethanol and 0.5 cc. of pyridine there is added 16.3 g. of β-chloroethoxyethane. The mixture is stirred and boiled under reflux for eight hours. The clear solution obtained deposits crystals on standing. The yield is 20 g. On recrystallization from water, the compound separates in colorless crystals, M.P. 148–149° C., having the formula

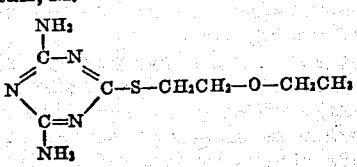

Example 7

A solution of 21.5 g. of thioammeline, 6.6 g. of sodium hydroxide, 100 cc. of water and 100 cc. of alcohol is mixed with 46. 8 g. of 2-phenyl-4-chloro-phenoxyethoxy ethyl chloride and boiled with stirring under reflux for nine hours. The oily layer which forms is then separated, taken up in benzene and washed with water. The benzene layer gradually crystallizes. Upon recrystallization from benzene, the product forms colorless crystals, M. P. 147° C., having the formula

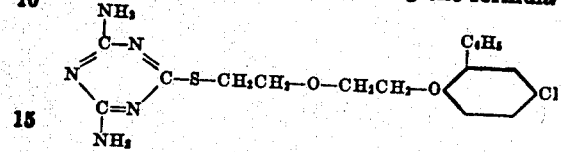

Example 8

A solution of 21.5 g. of thioammeline, 6.6 g. of sodium hydroxide, 100 cc. of water and 100 cc. of alcohol is mixed with 37.6 g. of β-chloro-β'-2-naphthoxy-diethyl ether and boiled under reflux for eight hours with rapid agitation. On cooling, the white crystalline product obtained is filtered off, washed with water, then with alcohol and finally recrystallized from toluene. It separates in colorless crystals, M. P. 148–149° C., having the formula

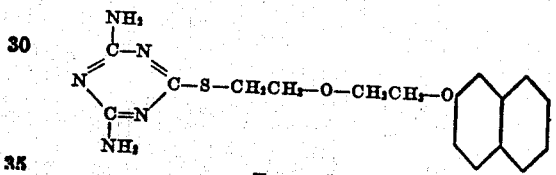

Example 9

A solution of 42.9 g. of thioammeline, 13.2 g. of sodium hydroxide, 200 cc. of water, and 200 cc. of alcohol is mixed with 32 g. of β-chloroethyl vinyl ether and boiled under reflux for 15 hours with rapid agitation. The reaction mixture is cooled and diluted with an equal volume of water. The oil which separates rapidly crystallizes. After recrystallization from hot water, it forms colorless crystals, M. P. 127–128° C., having the formula

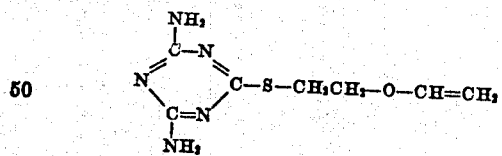

The compounds obtained according to this invention are useful alone or in the form of their salts as bactericides, insecticides, vulcanization accelerators, corrosion inhibitors, pickling inhibitors, additives for petroleum products, intermediates for textile assistants, dyes, drugs, etc. They may be condensed with aldehydes, such as formaldehyde, to form useful resins. They may also be used in conjunction with phenols, urea, thiourea, dicyandiamide, or other methylol-forming compounds for the formation of resins suitable for coating, casting, laminating, molding, or impregnating compositions. Resins formed therewith are of particular interest because of the increased alcohol tolerance resulting from the presence of the polyether linkages.

I claim:

1. A method for preparing polyethers of thioammeline, which comprises reacting in the presence of an alkaline, acid-binding agent thioammeline and a β-halogenoalkyl ether having at least three carbon atoms.

2. A method for preparing polyethers of thioammeline, which comprises reacting in the presence of an alkaline, acid-binding agent thioammeline and a β-chloroethyl ether containing at least three carbon atoms.

3. A thioether of ammeline of the formula

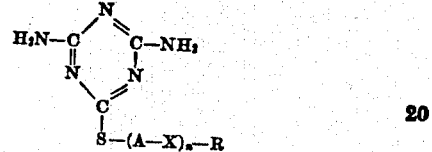

wherein A represents an alkylene group of at least two carbon atoms, X represents at least one member of the group consisting of oxygen and sulfur atoms, $n$ represents an integer from one to four inclusive, and R represents a member of the group consisting of aryl groups, aralkyl groups, heterocyclic groups, and alicyclic and aliphatic hydrocarbon groups.

4. A thioether of ammeline of the formula

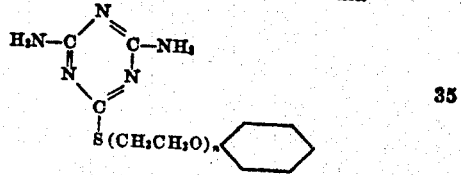

wherein $n$ represents an integer from one to four inclusive.

5. A compound having the formula

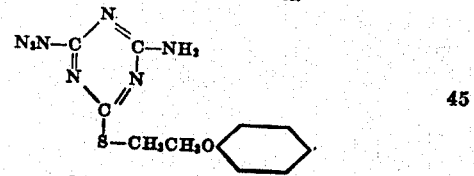

6. A compound having the formula

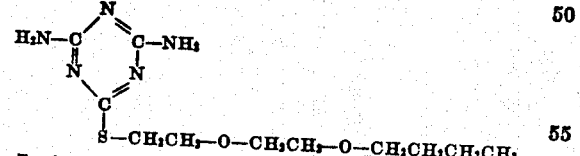

7. A compound having the formula

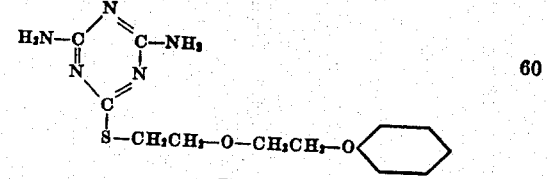

HERMAN A. BRUSON.